(12) United States Patent
    Au

(10) Patent No.: US 12,686,503 B2
(45) Date of Patent: Jul. 21, 2026

(54) DETERMINING A CONFIGURATION STATUS OF A COMPONENT OF A LANDING GEAR ASSEMBLY OF AN AIRCRAFT

(71) Applicant: Airbus Operations Limited, Bristol (GB)

(72) Inventor: Ting Yu Au, Bristol (GB)

(73) Assignee: Airbus Operations Limited, Bristol (GB)

( * ) Notice: Subject to any disclaimer, the term of this patent is extended or adjusted under 35 U.S.C. 154(b) by 122 days.

(21) Appl. No.: 18/392,626

(22) Filed: Dec. 21, 2023

(65) Prior Publication Data

US 2024/0253815 A1    Aug. 1, 2024

(30) Foreign Application Priority Data

Jan. 31, 2023    (GB) ...................................... 2301334

(51) Int. Cl.
    *B64D 45/00*        (2006.01)
    *G01S 7/48*          (2006.01)
(52) U.S. Cl.
    CPC ........ *B64D 45/0005* (2013.01); *G01S 7/4802* (2013.01)
(58) Field of Classification Search
    None
    See application file for complete search history.

(56) References Cited

U.S. PATENT DOCUMENTS 9,068,809 B1    6/2015  Lagally
2014/0222325 A1*  8/2014  Followell .................. B64F 5/60
                                                  701/34.3

(Continued)

FOREIGN PATENT DOCUMENTS

CN      106091963 A  * 11/2016  ............. G01B 11/16
EP        3169588 A1     5/2017

(Continued)

OTHER PUBLICATIONS

Translation of CN-106091963-A (Year: 2016).*

(Continued)

*Primary Examiner* — Faris S Almatrahi
*Assistant Examiner* — Selena M Jin
(74) *Attorney, Agent, or Firm* — KDW Firm PLLC

(57)                ABSTRACT

A method of determining configuration status of a component of an aircraft landing gear assembly. The component with a lidar system is scanned to generate a set of position data points. A subset of the position data points is determined, the subset having position data points corresponding to positions in a predetermined region of the landing gear assembly, the predetermined region including a part of the component. The representative position point of the subset of position data points is determined, and it is determining if the position is beyond a predetermined threshold position. If the point is beyond the predetermined threshold position, a signal indicating the component of the landing gear assembly has a first configuration status is output, and if the representative position point is not beyond the predetermined threshold position, a signal indicating the component of the landing gear assembly has a second configuration status is output.

19 Claims, 13 Drawing Sheets

(56)          References Cited

U.S. PATENT DOCUMENTS

| | | | | |
|---|---|---|---|---|
| 2015/0151832 A1* | 6/2015 | Filho | ..................... | B64C 25/22 |
| | | | | 244/102 R |
| 2015/0268090 A1* | 9/2015 | Munger | ................. | G01H 1/00 |
| | | | | 73/583 |
| 2017/0139045 A1* | 5/2017 | Cherepinsky | ........... | G01S 17/88 |
| 2020/0027363 A1* | 1/2020 | Vana | ...................... | G08G 5/80 |
| 2020/0122860 A1* | 4/2020 | Dong | .................... | G01B 11/14 |
| 2020/0262588 A1* | 8/2020 | Nakhjavani | ............ | B64C 25/14 |
| 2020/0277043 A1* | 9/2020 | Kerr | ..................... | B64C 25/26 |
| 2020/0290750 A1* | 9/2020 | Ferrell | .............. | B64D 45/0005 |
| 2022/0024566 A1* | 1/2022 | Tofflemire | ......... | B64D 45/0005 |
| 2023/0048696 A1* | 2/2023 | Pesik | .................... | G06V 40/10 |
| 2023/0099541 A1* | 3/2023 | Au | ......................... | B64C 25/34 |
| | | | | 701/530 |

FOREIGN PATENT DOCUMENTS

| | | | | | |
|---|---|---|---|---|---|
| GB | 2574441 A | | 12/2019 | | |
| GB | 2583182 A | | 10/2020 | | |
| GB | 2587416 A | * | 3/2021 | ............ | G01S 17/88 |
| GB | 2611096 A | | 3/2023 | | |
| WO | WO-2022186826 A1 | * | 9/2022 | ............ | H04N 23/90 |

OTHER PUBLICATIONS

Li, F., Wu, Z., Li, J., Lai, Z., Zhao, B., & Min, C. (2021). A Multi-Step CNN-Based Estimation of Aircraft Landing Gear Angles. Sensors, 21(24), 8440. https://doi.org/10.3390/s21248440 (Year: 2021).*
British Search Report for Application No. 2301334 dated Jul. 21, 2023.

\* cited by examiner

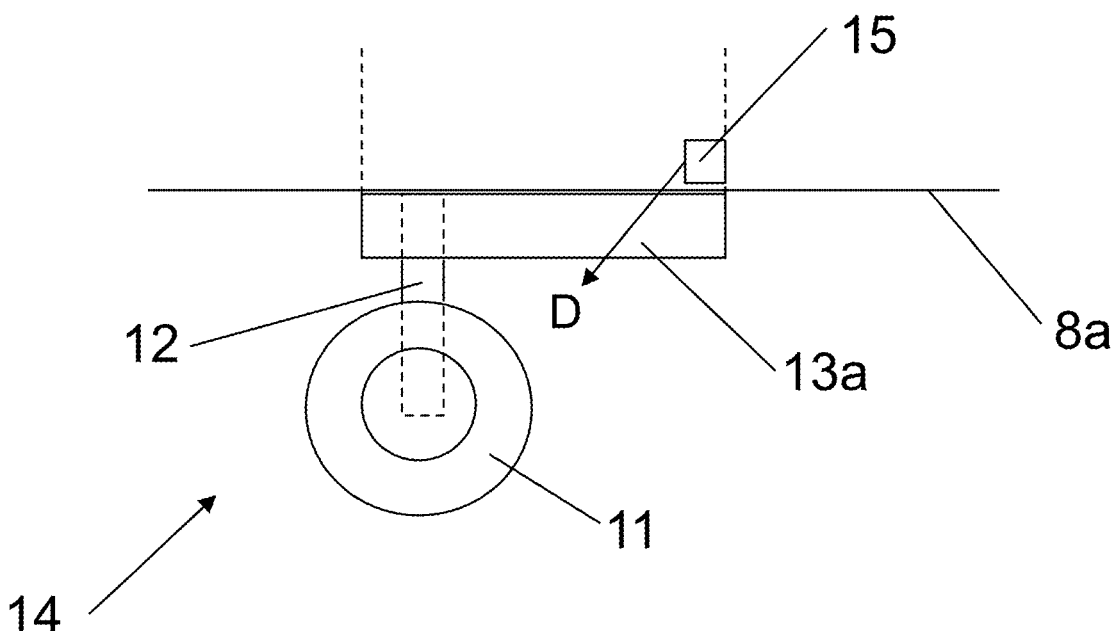
Fig. 2

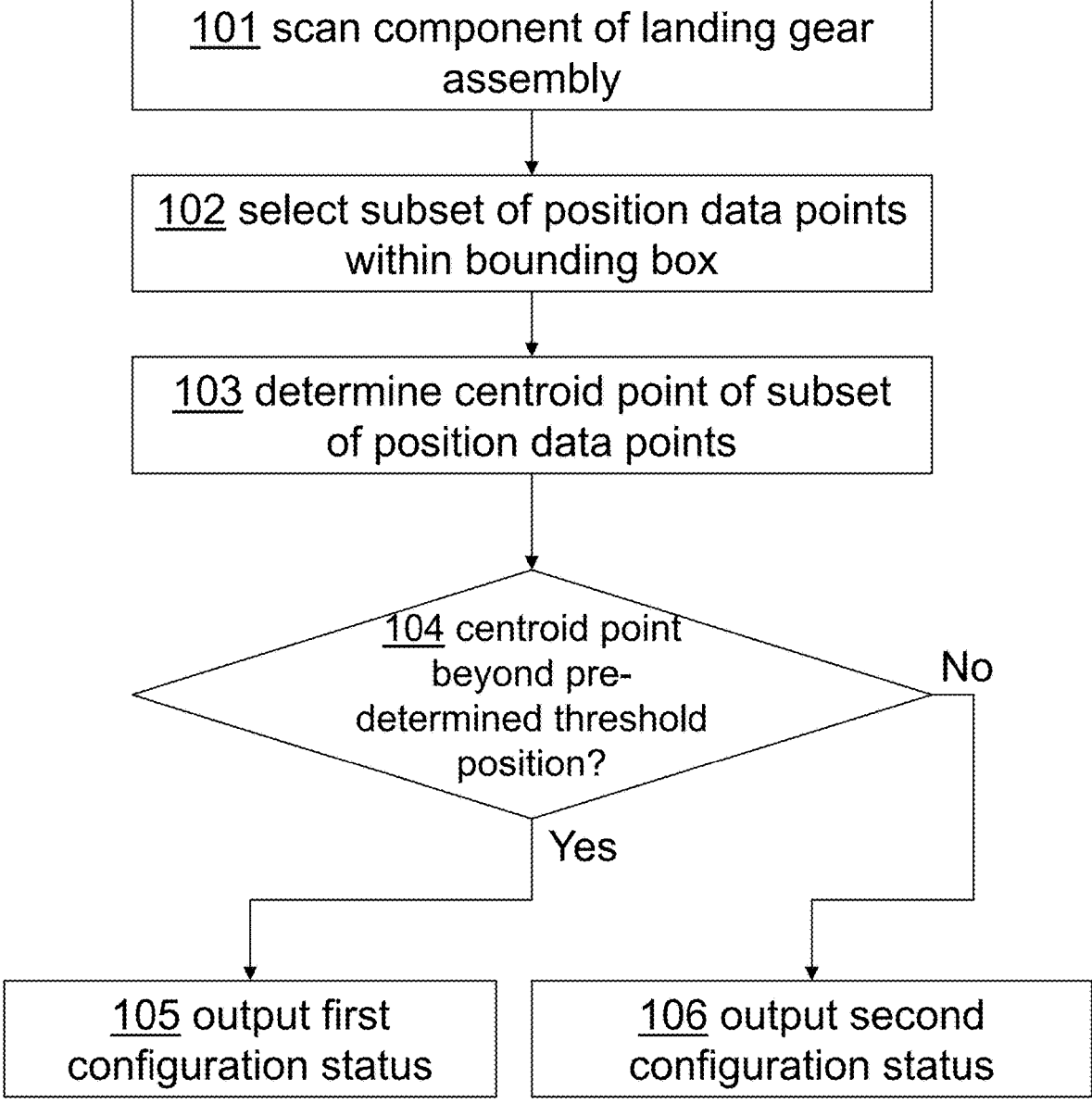
<u>Fig. 3</u>

55          52

53

60

52a

55a

53

60

13a

13b

60a

60b

13b

13a

60a

60b

60a

60b

DETERMINING A CONFIGURATION STATUS OF A COMPONENT OF A LANDING GEAR ASSEMBLY OF AN AIRCRAFT

TECHNICAL FIELD

The present disclosure relates to methods and systems for determining a configuration status of a component of a landing gear assembly of an aircraft, in particular using lidar ("light detection and ranging" or "laser imaging, detection, and ranging", also sometimes known as 3D laser scanning).

BACKGROUND

With aircraft, it is often desirable to monitor the configuration status of the components of a landing gear assembly, for example whether aircraft landing gear doors are open or closed, or whether an aircraft landing gear wheel assembly is extended or retracted. It is known to do this using proximity sensors. However, it is a disadvantage of the use of proximity sensors that a large number of sensors are required to achieve the required level of system robustness, and the wiring/rigging requirements of proximity sensors can be large and costly.

It is also known to use position-sensing systems such as lidar to determine the position of the components of a landing gear assembly. GB 2587416 A (Airbus Operations Limited) published 31 Mar. 2021 discloses the use of various sensing systems, including lidar systems, to determine the positions of the components of a landing gear assembly. However, the processing resources required to make a determination of the position of a component of a landing gear assembly from data provided by a lidar system can be considerable.

It would be advantageous to be able to provide systems that could determine the configuration status of a component of a landing gear assembly of an aircraft reliably and accurately, while not requiring large processing resources to be used.

The disclosure herein seeks to solve and/or mitigate some or all of the above-mentioned problems. Alternatively or additionally, the disclosure herein seeks to provide improved methods and systems for determining a configuration status of a component of a landing gear assembly of an aircraft.

SUMMARY

The disclosure herein provides, according to a first aspect, a method of determining a configuration status of a component of a landing gear assembly of an aircraft, the method comprising the steps of:

scanning the component of the landing gear assembly with a lidar system to generate a set of position data points;

determining a subset of the position data points, wherein the subset of the position data points consists of position data points corresponding to positions in a predetermined region of the landing gear assembly, wherein the predetermined region includes a part of the component of the landing gear assembly;

determining a representative position point of the subset of position data points;

determining if the position of the representative position point is beyond a predetermined threshold position; and if the representative position point is beyond the predetermined threshold position, outputting a signal indicating that the component of the landing gear assembly has a first configuration status;

if the representative position point is not beyond the predetermined threshold position, outputting a signal indicating that the component of the landing gear assembly has a second configuration status.

It has been found that when the position data points for a predetermined region of the landing gear assembly including a part of a component are used to determine a representative position point, a configuration status of the component can be determined by determining if the position of the representative position point is beyond a predetermined threshold position. This provides a simple determination of the configuration status of the component and has been found to provide a reliable determination in different lighting conditions.

The representative position point may be the centroid point of the subset of position data points. The predetermined threshold position may be a position along an axis of the region of the landing gear assembly.

The subset of the position data points may be a proper subset of the set of position data points. Alternatively, only the predetermined region may be scanned by the lidar system, so that the initial set of position data points consists of only position data points corresponding to positions in the predetermined region.

The component of the landing gear assembly may comprise one or more parts that are not included in the predetermined region.

The component of the landing gear assembly may be a landing gear door. In this case, the first configuration status may be an open status indicating that the landing gear door is open, and the second configuration status may be a closed status indicating that the landing gear door is closed.

Alternatively, the component of the landing gear assembly may be a landing gear wheel assembly. In this case, the first configuration status may be an extended status indicating that the landing gear wheel assembly is extended, and the second configuration status may be a retracted status indicating that the landing gear wheel assembly is retracted.

The part of the component of the landing gear assembly may be a hinge. Alternatively, the part of the component of the landing gear assembly may be a movable strut. Alternatively, the part of the component of the landing gear assembly may be an actuator. It will be appreciated that any other suitable parts of the component of the landing gear assembly could be used.

The method may further comprise the steps of:

determining if the position of the representative position point is beyond a second predetermined threshold position; and if the representative position point is beyond the second predetermined threshold position, outputting a signal indicating that the component of the landing gear assembly has a third configuration status;

if the representative position point is not beyond the second predetermined threshold position, outputting a signal indicating that the component of the landing gear assembly has a fourth configuration status. It will be appreciated that the configuration status could be determined in other ways, for example the component of the landing gear assembly could be determined to be in a third status if the representative position point is between the first predetermined threshold position and the second predetermined threshold position.

Where the component of the landing gear assembly is a landing gear wheel assembly, the third configuration status could be a locked status indicating that the landing gear wheel assembly is locked in the extended position and locked, and the fourth configuration status could be an unlocked status indicating that the landing gear wheel assembly is in the extended position but unlocked.

The method may further include the step of determining the predetermined region of the landing gear assembly. Alternatively or additionally, the method may further include the step of determining the predetermined threshold position.

The disclosure herein provides, according to a second aspect, an aircraft comprising:

a landing gear assembly comprising a component;

a lidar system arranged to scan the component of the landing gear assembly and generate a set of position data points; and a computer system arranged to output a signal indicating a configuration status of the component of a landing gear assembly using the set of position data points in accordance with the methods as described above.

The disclosure herein provides, according to a third aspect, a non-transitory computer readable medium comprising computer-readable program code for determining a configuration status of a component of a landing gear assembly of an aircraft, the computer-readable program code arranged, when executed in a computer system of an aircraft comprising:

a landing gear assembly comprising a component; and a lidar system arranged to scan the component of the landing gear assembly and generate a set of position data points; to cause the computer system to output a signal indicating a configuration status of the component of a landing gear assembly using the set of position data points in accordance with the methods as described above.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which:

FIG. 2 shows a side view of the bottom part the fuselage of the aircraft in the area of the nose landing gear;

FIG. 3 shows a flowchart of a method of determining the configuration status of a component of a landing gear assembly according to example embodiments of the disclosure herein;

FIG. 4b is a depth image of the area of FIG. 4a;

4

Figures 7A, 7B:
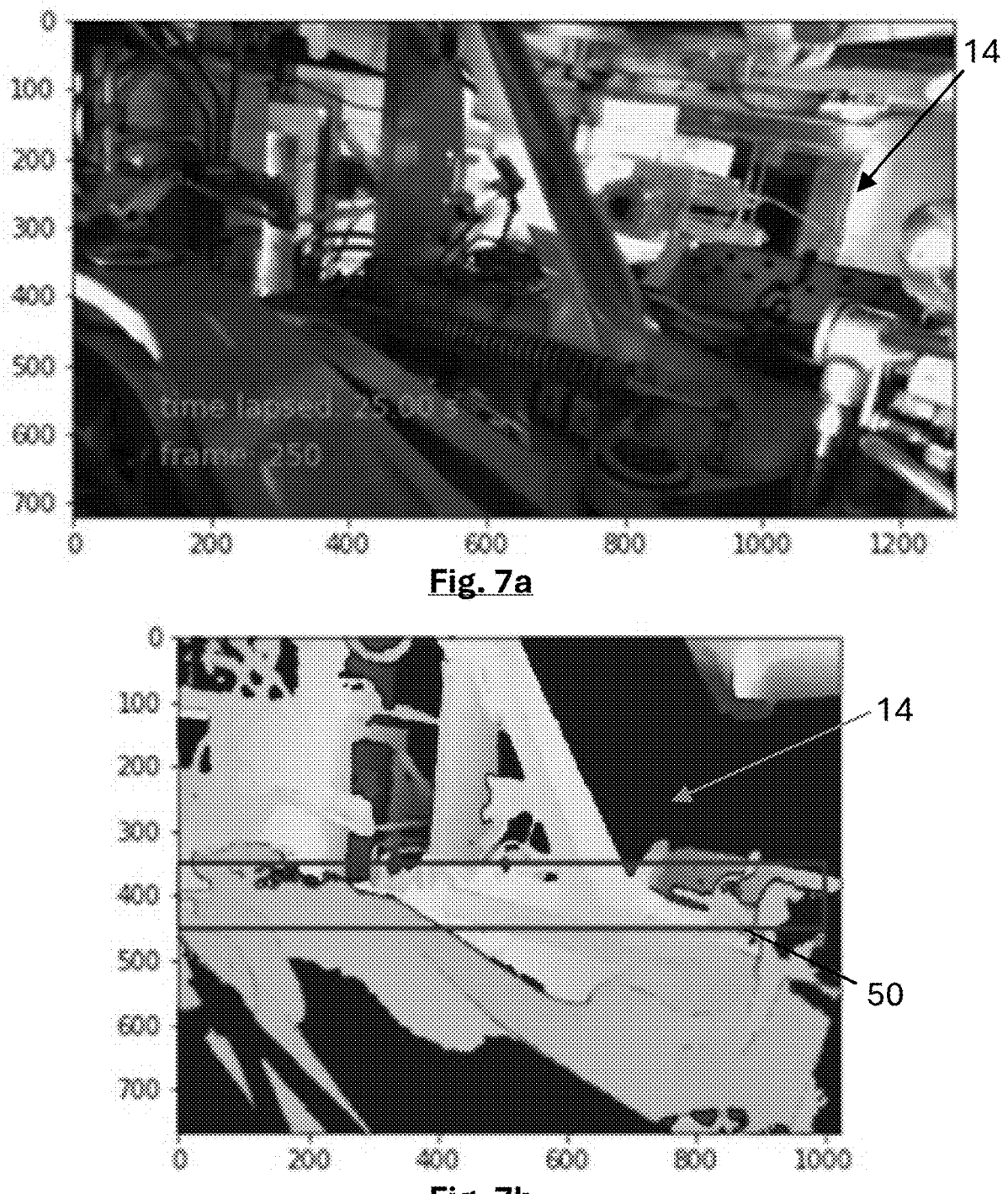
Figure 8A:
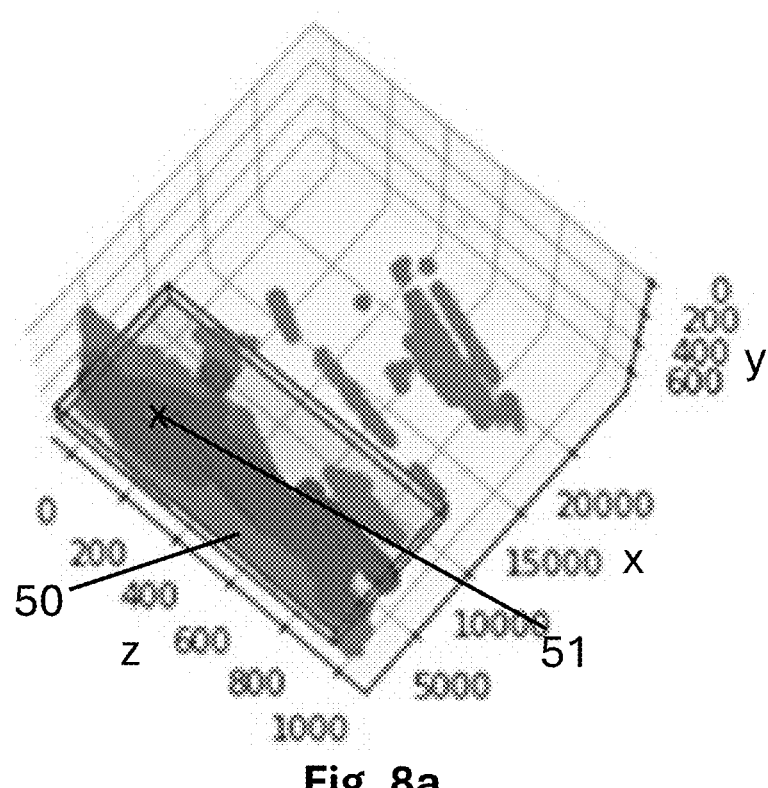
Figure 8B:
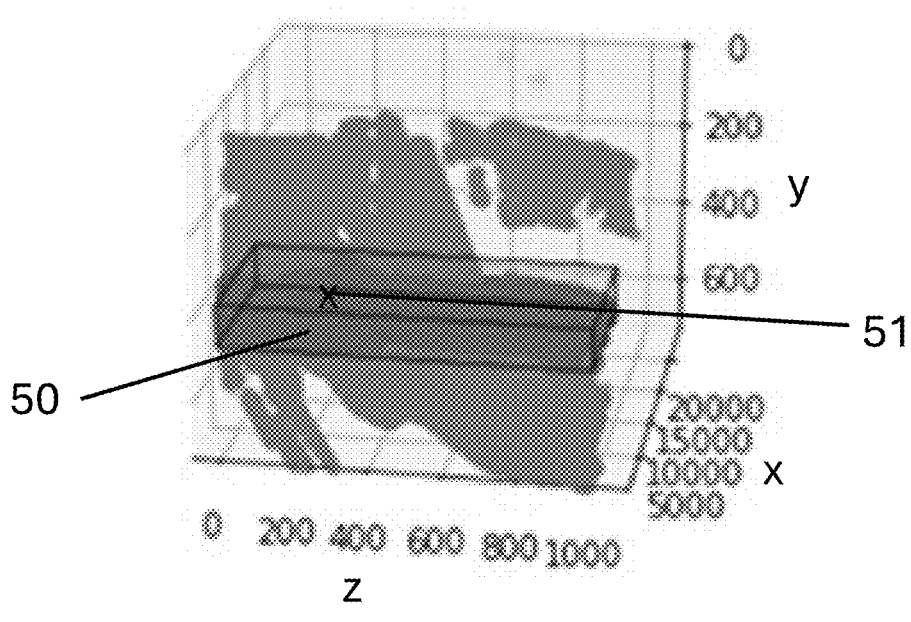
Figure 9A:
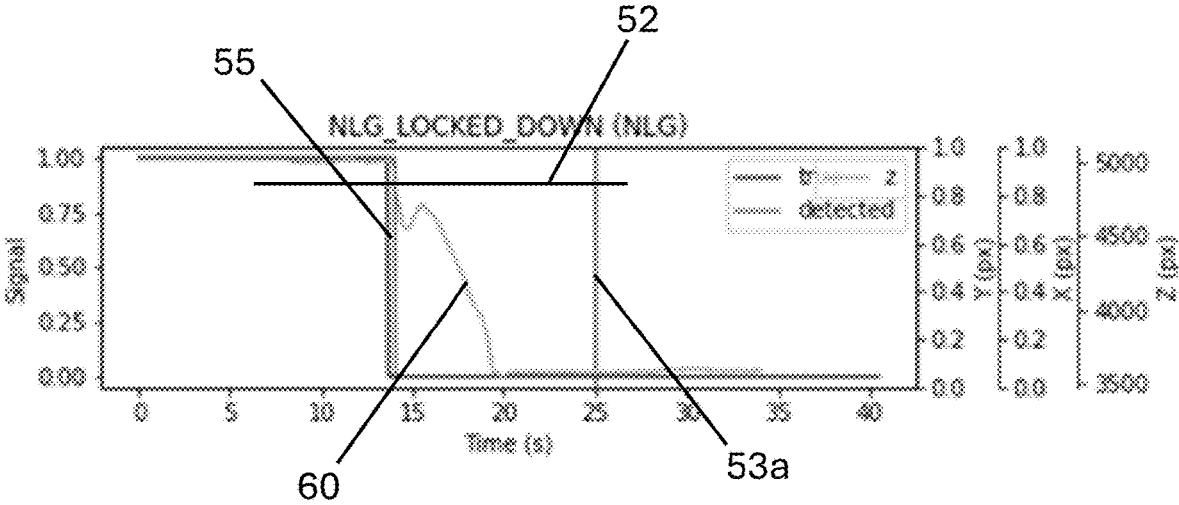
Figure 9B:
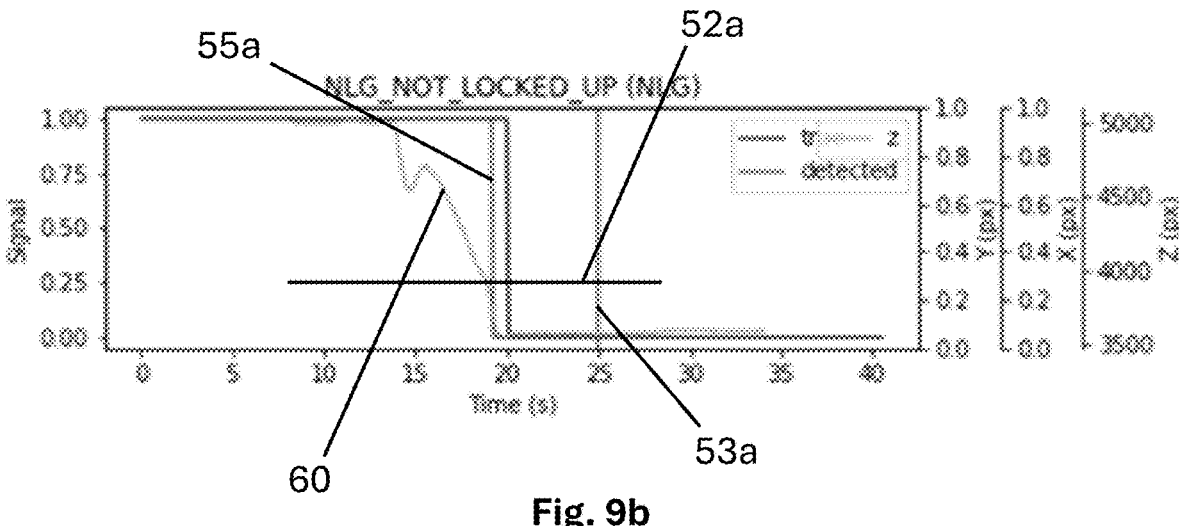
Figure 10A:
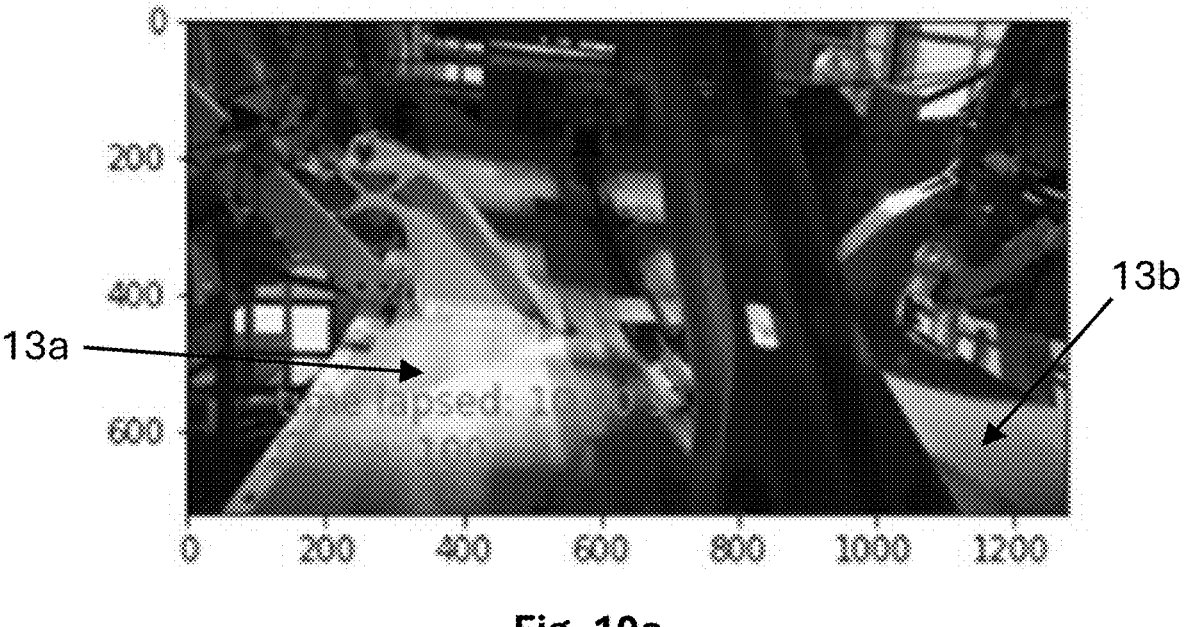
Figure 10B:
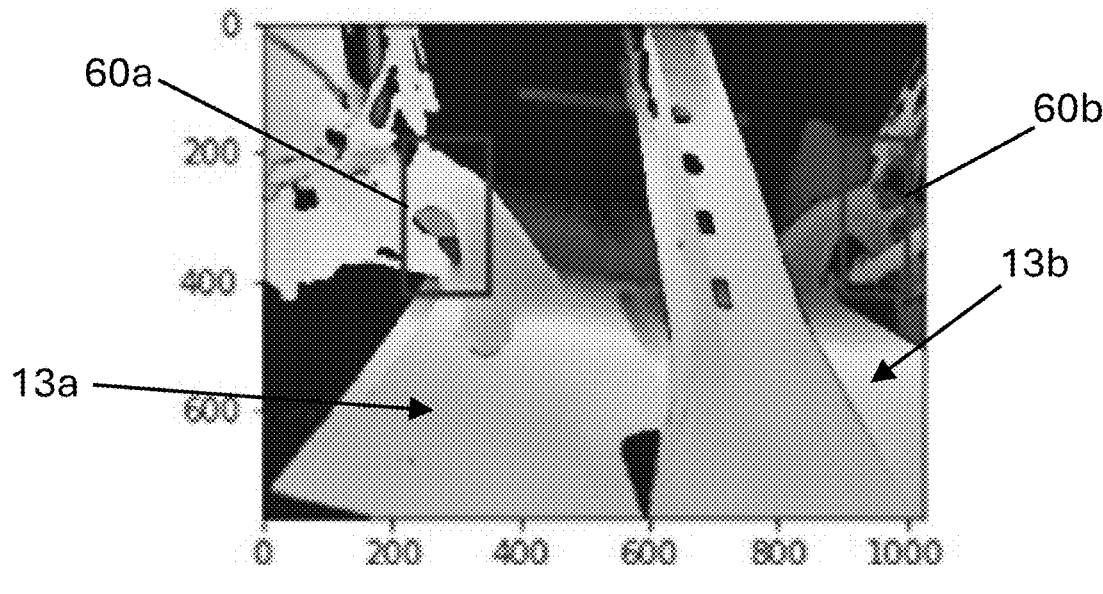
Figure 11A:
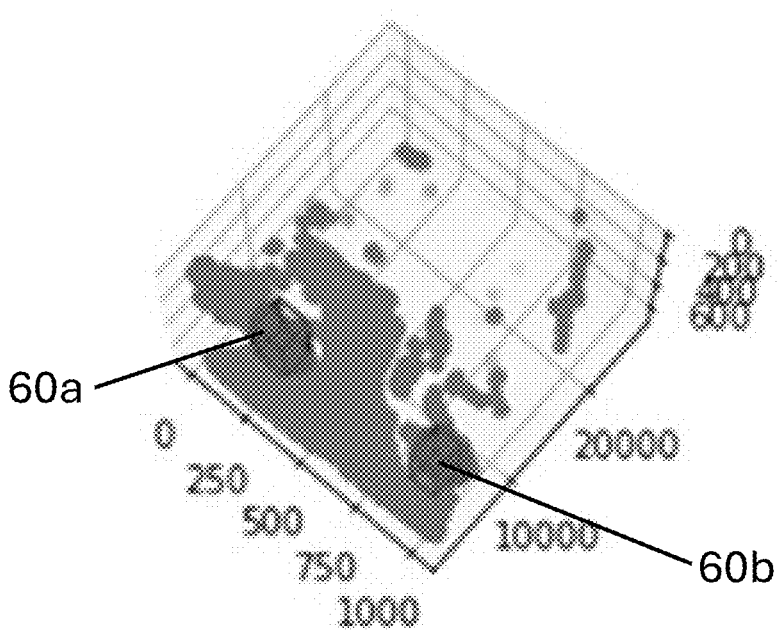
Figure 11B:
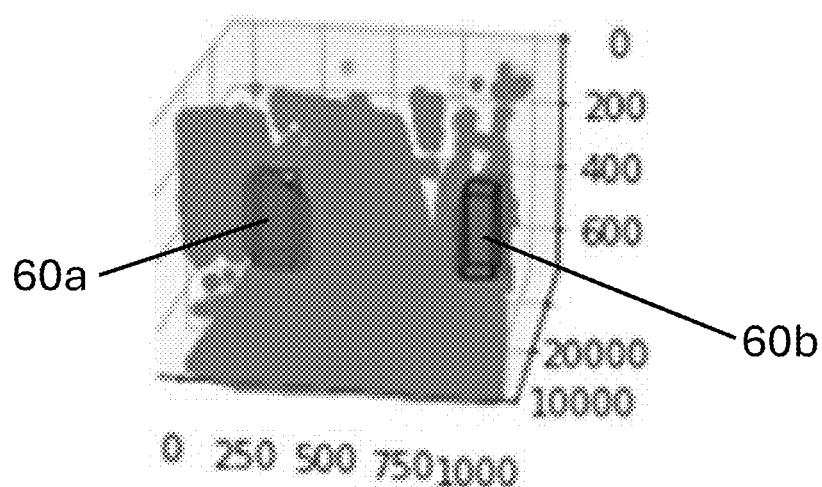
Figure 12A:
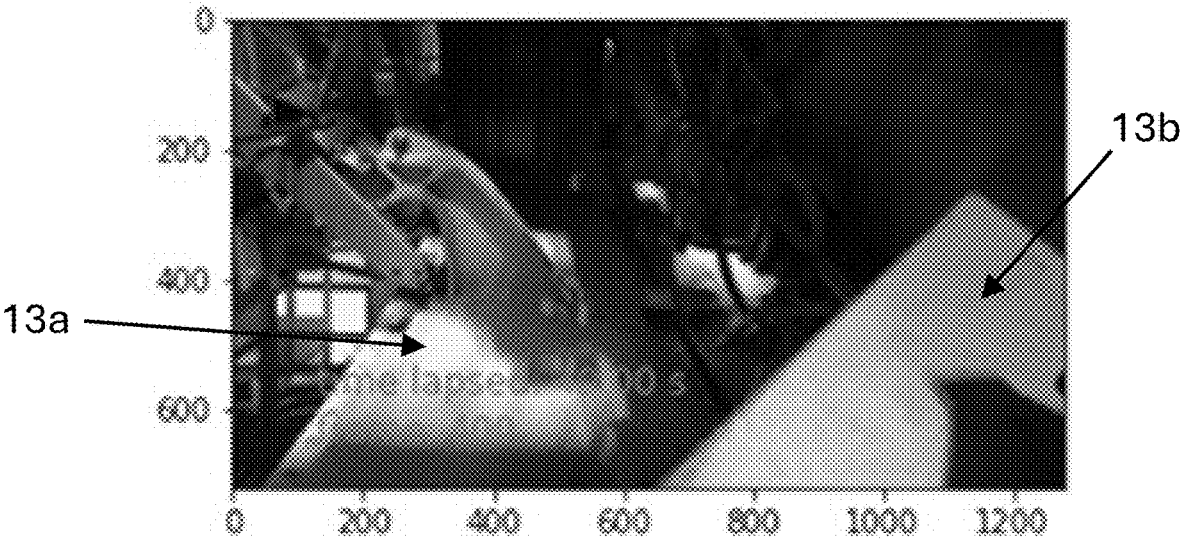
Figure 12B:
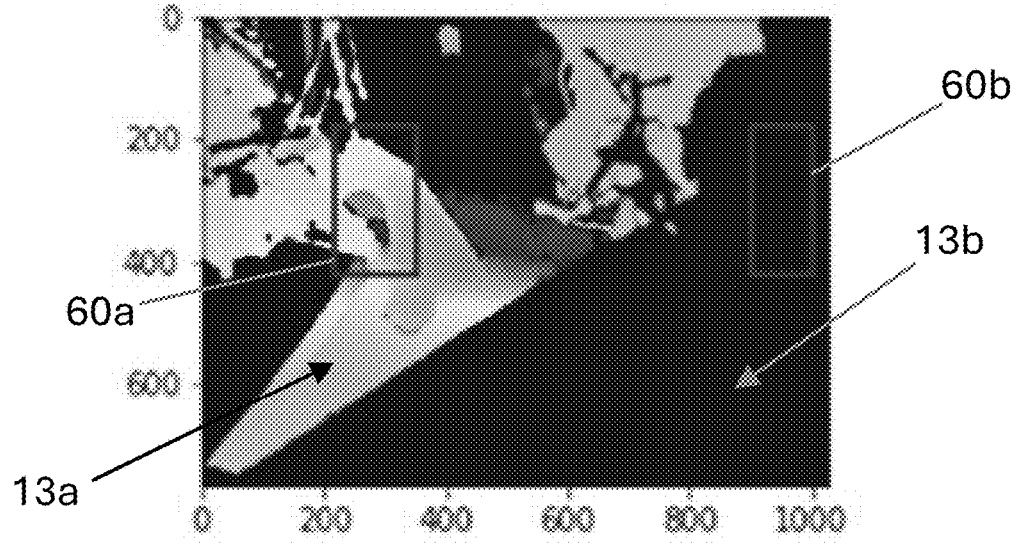

FIG. 7a is a photograph of an area of the nose landing gear of FIG. 2 including wheel arrangement in retracted configuration;

FIG. 7b is a depth image of the area of FIG. 7a;

FIGS. 8a and 8b show the lidar data obtained when the area of FIG. 7a is scanned by a lidar system;

FIGS. 9a and 9b are graphs showing the generation of signals from the lidar data of FIGS. 8a and 8b;

FIG. 10a is a photograph of an area of the nose landing gear of FIG. 2 including doors in extended configuration;

FIG. 10b is a depth image of the area of FIG. 10a;

FIGS. 11a and 11b show the lidar data obtained when the area of FIG. 10a is scanned by a lidar system;

FIG. 12a is a photograph of an area of the nose landing gear of FIG. 2 including doors in retracted configuration;

FIG. 12b is a depth image of the area of FIG. 12a; and

Figure 13A:
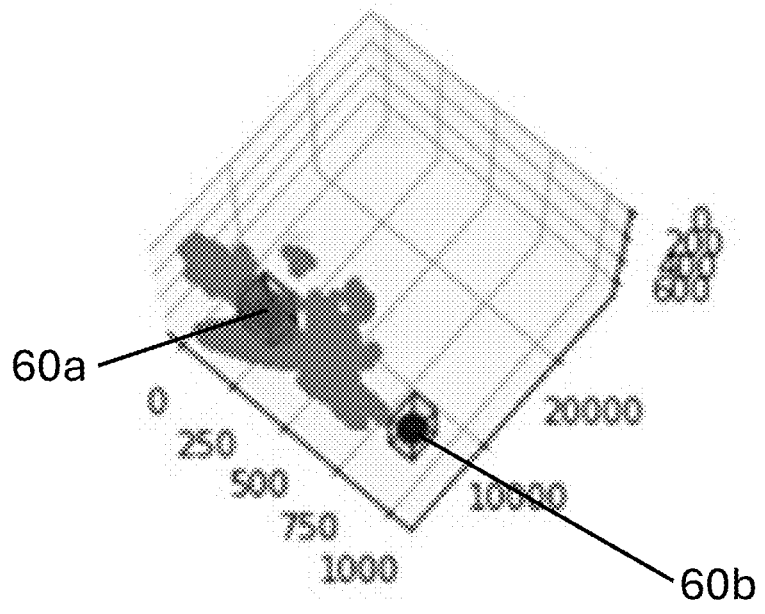
Figure 13B:
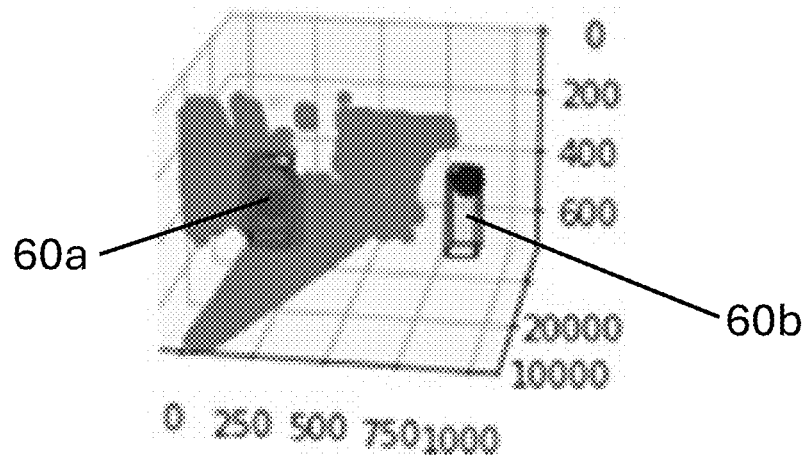

FIGS. 13a and 13b show the lidar data obtained when the area of FIG. 12a is scanned by a lidar system.

DETAILED DESCRIPTION

Figures 1A, 1B:
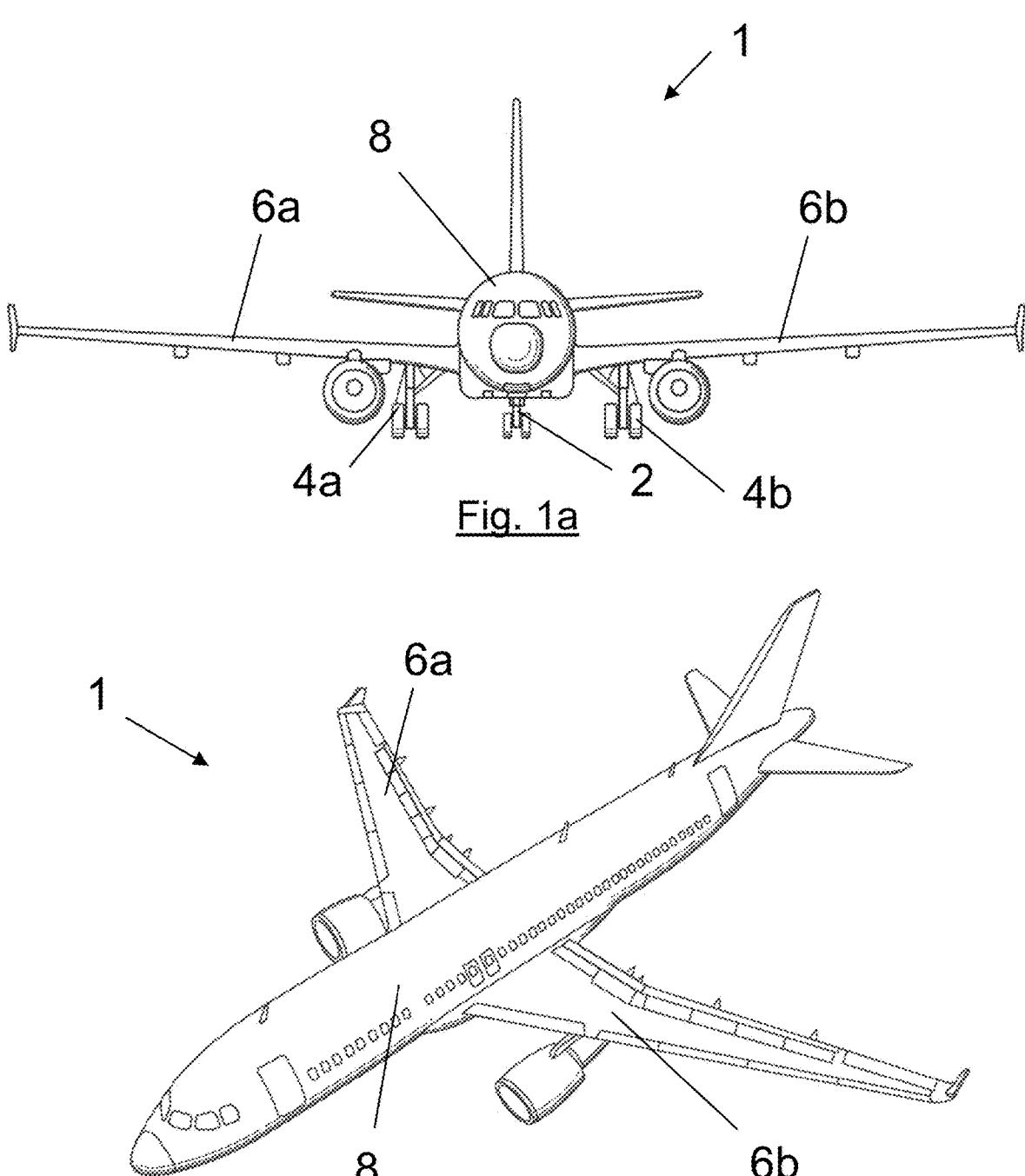
FIGS. 1a and 1b show a front and perspective view respectively of an aircraft including a system according to example embodiments of the disclosure herein.

FIGS. 1a and 1b show a front view and perspective view respectively of an aircraft 1 comprising a system in accordance with embodiments of the disclosure herein. The aircraft comprises a fuselage 8 with wings 6a and 6b mounted either side. As can be seen in particular from FIG. 1a, a nose landing gear 2 mounted on the underside of the fuselage 8, and main landing gear 4a and 4b mounted on the underside of the wings 6a and 6b respectively, are all in extended configuration.

FIG. 2 shows a side view of the bottom part of the fuselage 8 in the area of the nose landing gear 2. As can be seen, the nose landing gear 2 comprises a wheel arrangement 14 comprising a wheel 11 mounted on a strut 12. A right-side (as viewed facing the nose of the aircraft 1) door 13a of the nose landing gear 2 in the underside 8a of the fuselage 8 is in the open position, so that the nose landing gear 2 has been able to extend. The nose landing gear 2 also comprises a corresponding left-side door 13b, not shown in FIG. 2, which is also in the open position.

The nose landing gear 2 as shown in FIG. 2 is part way between its retracted configuration and extended configuration. In the retracted configuration, the strut 12 is rotated anticlockwise (as viewed from the side in FIG. 2) so that the wheel arrangement 14 is above the underside 8a of the fuselage 8 and the right-side door 13a and left-side door 13b can be closed. To move to the extended configuration the right-side door 13a and left-side door 13b are opened, and the strut 12 is rotated clockwise to the configuration shown in FIG. 2. The right-side door 13a and left-side door 13b are then closed again, to give the extended configuration.

A lidar scanner 15 is mounted on the back interior wall of the nose landing gear 2 (i.e. the wall furthest from the nose of the aircraft 1), above the level of the right-side door 13a and left-side door 13b when closed. The lidar scanner 15 scans in the direction marked by the arrow D in FIG. 2, i.e. in the general direction of the wheel arrangement 14. However, in other embodiments the lidar scanner may be positioned, for example, on the front or side interior walls of the landing gear system, or in any other positions from which the components of the landing gear can be scanned by the lidar scanner.

A method of determining the configuration status of a component of the nose landing gear 2 using the lidar scanner 15 is now described with reference to the flowchart of FIG. 3.

Figure 4A:
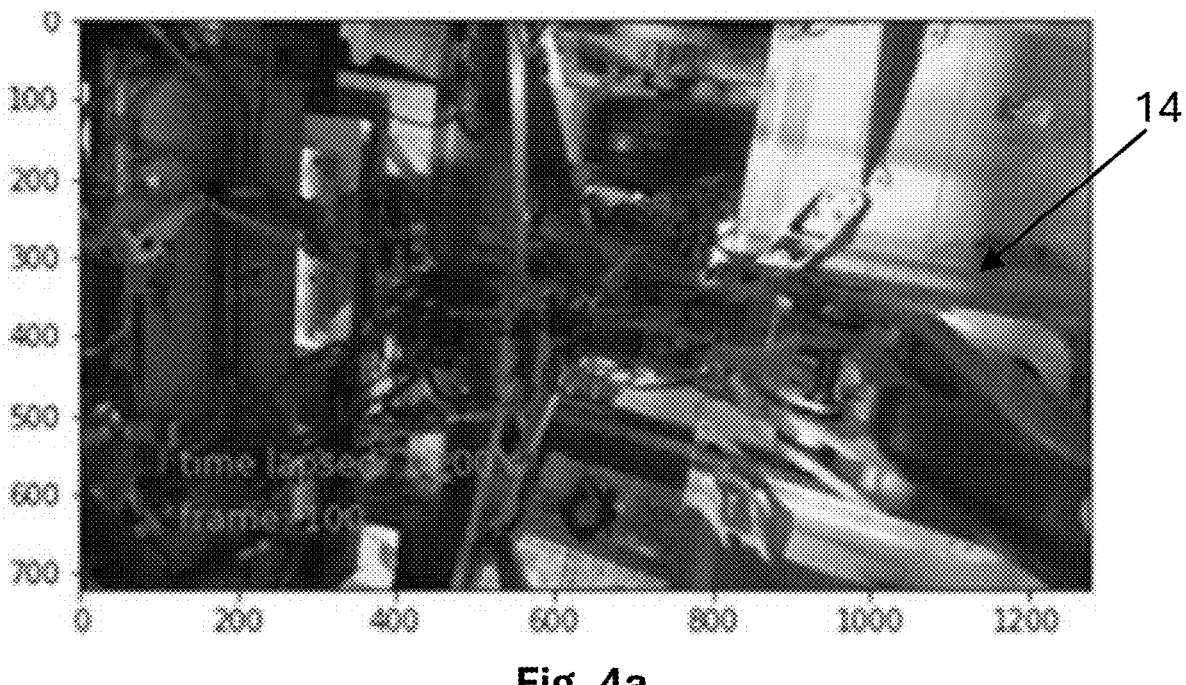
FIG. 4a is a photograph of an area of the nose landing gear of FIG. 2 including wheel arrangement in extended configuration.

In a first step, the lidar scanner 15 scans an area in which the components of the nose landing gear 2 are positioned (step 101). The area scanned by the lidar scanner 15 is shown in FIG. 4a, which is a photograph of the area of the nose landing gear 2 including the wheel arrangement 14 in extended configuration, and FIG. 4b, which is a corresponding depth image (i.e. showing distance from the camera). The depth image of FIG. 4b includes part of a bounding box 50 enclosing part of the wheel arrangement 14. The bounding box 50 defines a predetermined region of the nose landing gear 2, which in the present embodiment includes in particular part of the wheel arrangement 14 of the nose landing gear 2.

FIGS. 7a and 7b show respectively a corresponding photograph and depth image of the area of the nose landing gear 2, in particular the wheel arrangement 14 thereof, in retracted configuration.

Figure 5A:
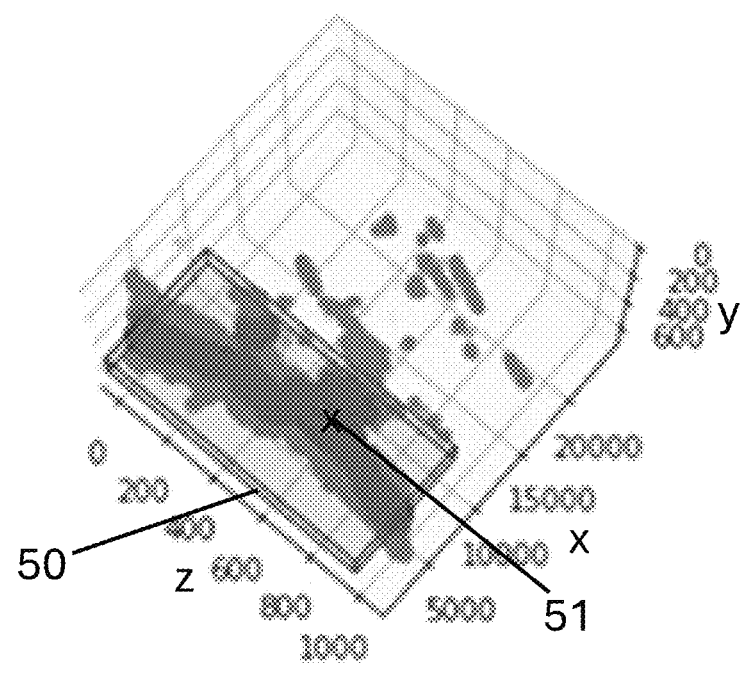
FIGS. 5a and 5b show the lidar data obtained when the area of FIG. 4a is scanned by a lidar system.
Figure 5B:
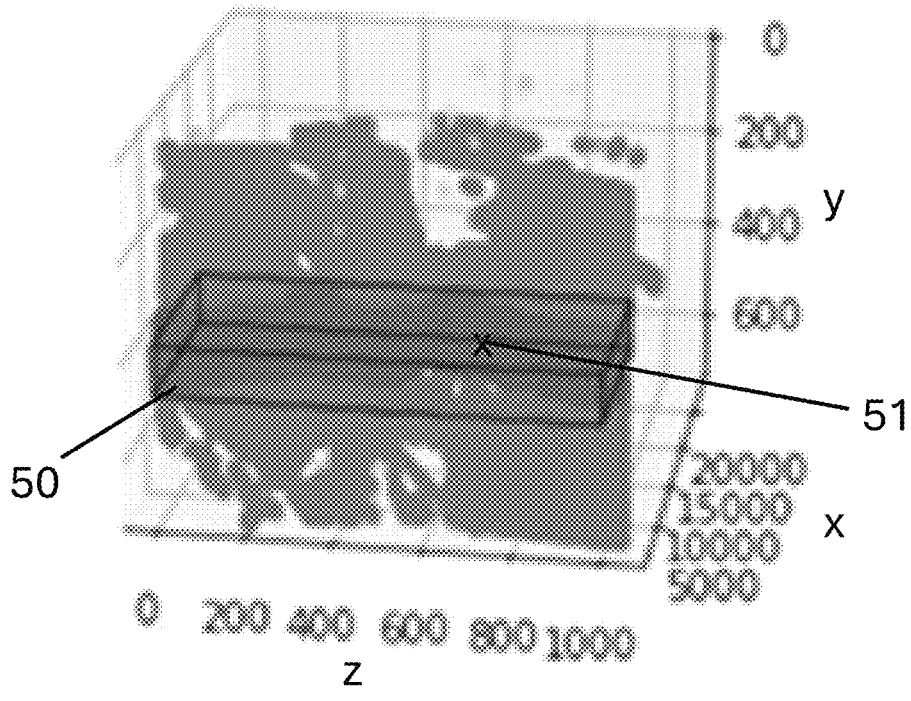

FIGS. 5a and 5b show from different angles the lidar data generated by the lidar scanner 15, i.e. a set of position data points. Each position data point comprises a set of three orthogonal position values. The orthogonal position values for each position data point are determined by the lidar scanner 15 based on the direction its laser is pointing and the time the light of the laser takes to be returned, in accordance with standard methods. The FIG. 5a and 5b show the bounding box 50, which can be seen to be a cuboid. The position data points within the bounding box 50 are coloured blue for clarity.

FIGS. 8a and 8b show from different angles the lidar data generated by the lidar scanner 15 when scanning the nose landing gear 2, in particular the wheel arrangement 14 thereof, in retracted configuration.

Next, the subset of position data points within the bounding box 50 is selected (step 102), so that any position data points outside the bounding box 50 are discarded. The centroid point 51 of the subset of position data points, i.e. of the position data points within the bounding box 50, is then determined (step 103). The centroid point 51 is shown in FIGS. 5a and 5b. The centroid point 51 is the mean average of all the position data points within the bounding box 50, so is representative of the overall position of the position data points within the bounding box 50. In other embodiments different representative position points for the clusters may be used, for example the centre point of the outermost position data points of the clusters. Various other methods of identifying representative position points will be apparent to the skilled person.

The centroid point 51a of the subset of position data points from the lidar scanner 15 when the nose landing gear 2, in particular the wheel arrangement 14 thereof, is in retracted configuration is shown in FIGS. 8a and 8b.

Figure 6A:
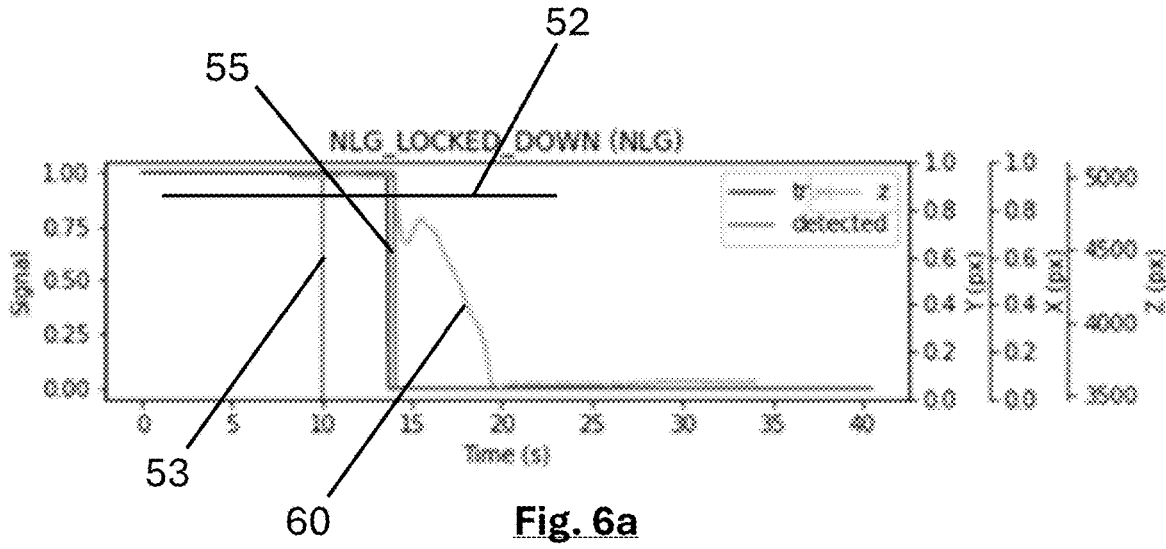
FIGS. 6a and 6b are graphs showing the generation of signals from the lidar data of FIGS. 5a and 5b.

Next, the centroid point 51 is compared to a predetermined threshold position, to determine whether the centroid point 51 is beyond the predetermined threshold position (step 104). FIG. 6a is a graph showing this comparison for a signal NLG_LOCKED_DOWN, which indicates if the wheel arrangement 14 is in the locked down configuration, i.e. is fully extended and locked in position. The graph shows how various values (indicated by positions on the vertical axis of the graph) vary over time (indicated by positions on the horizontal axis of the graph), as the wheel arrangement 14 is moved from being fully extended and locked in position to being fully retracted.

The centroid point of the subset of position data points within the bounding box 50 is shown as it changes as the wheel arrangement 14 changes configuration by the line 60. The position of the centroid point along a single axis, the z axis, is shown. As can be seen, the position along the z axis is above 5000 when the wheel arrangement 14 is fully extended and locked, and reduces to be around 3500 when the wheel arrangement 14 is fully retracted.

Figure 4B:
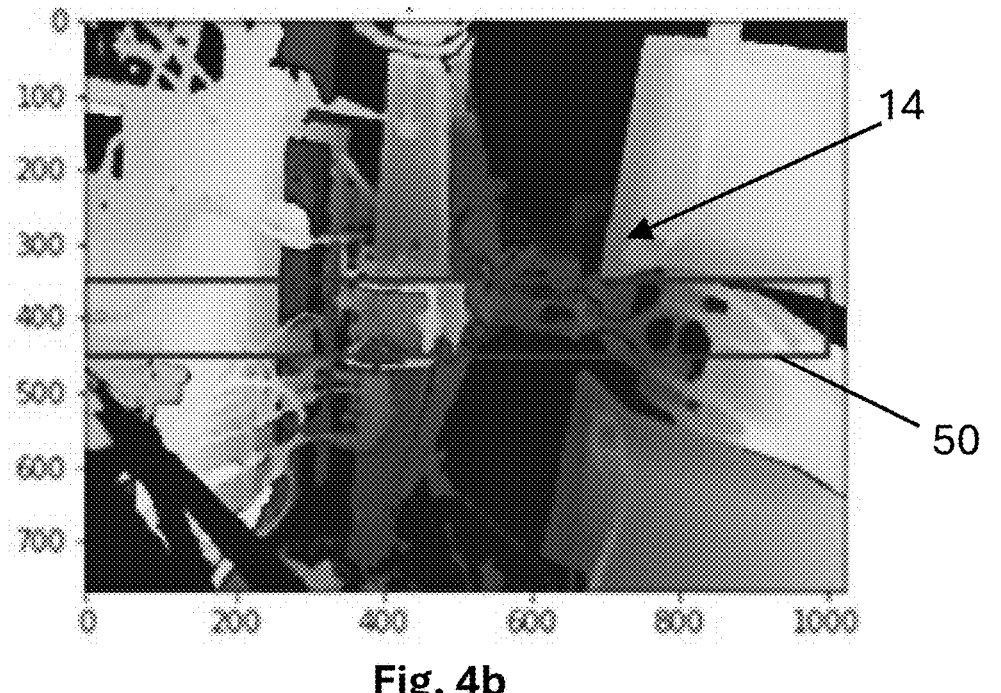

The predetermined threshold position is represented by a horizontal line 52, which as with the centroid point represents a position along the z axis, at roughly 4900. The line 55 represents the output of the signal NLG_LOCKED-_DOWN after comparison of the centroid point with the predetermined threshold position. As can be seen, when the z axis position of the centroid point is above the predetermined threshold position, the signal NLG_LOCKED-_DOWN is output at value 1, indicating that the wheel arrangement 14 is in the locked down configuration (step 105), and when the z axis position of the centroid point is below the predetermined threshold position, the signal NLG_LOCKED_DOWN is output at value 0, indicating that the wheel arrangement 14 is not in the locked down configuration (step 106). The centroid point 51 of the nose landing gear 2 in the configuration shown in FIGS. 4a and 4b is indicated by the vertical line 53, showing that when the wheel arrangement 14 is in this configuration, the signal NLG_LOCKED_DOWN will be output at value 1.

Thus, it can be seen that in the present embodiment, only the position of the centroid point along the z axis is used, and the position of the centroid point along either of the x axis or y axis is ignored. However, it will be appreciated that in other embodiments and x axis and/or the y axis may be used additionally or alternatively, with the predetermined threshold position being defined as required.

Figure 6B:
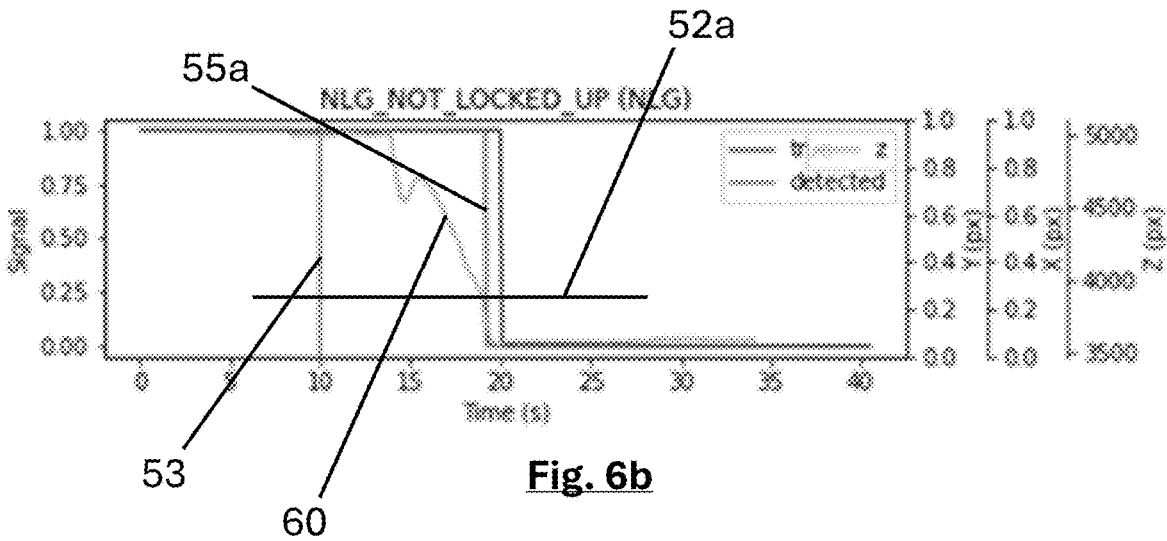

FIG. 6b is a graph showing the comparison of the centroid point 51 to a second predetermined threshold position, in order to provide a second signal NLG_NOT_LOCKED_UP, which indicates if the wheel arrangement 14 is not in the locked up configuration, i.e. is not fully retracted and locked in position. The predetermined threshold position is again represented by a horizontal line, but in this case the horizontal line 52a, which represents a position along the z axis at roughly 3800. The line 55a represents the output of the signal NLG_NOT_LOCKED_UP after comparison of the centroid point with the second predetermined threshold position. As can be seen, when the z axis position of the centroid point is above the second predetermined threshold position, the signal NLG_NOT_LOCKED_UP is output at value 1, indicating that the wheel arrangement 14 is not in the locked up configuration, and when the z axis position of the centroid point is below the second predetermined threshold position, the signal NLG_NOT_LOCKED_UP is output at value 0, indicating that the wheel arrangement 14 is (not not) in the locked up configuration. The centroid point 51 of the nose landing gear 2 in the configuration shown in FIGS. 4a and 4b is again indicated by the vertical line 53, showing that when the wheel arrangement 14 is in this configuration, the signal NLG_NOT_LOCKED_UP will be output at value 1.

FIGS. 9a and 9b are graphs corresponding to those of FIGS. 6a and 6b, but showing instead the centroid point 51a of the nose landing gear 2, in particular the wheel arrangement 14 thereof, in the configuration shown in FIGS. 6a and 6b. This is indicated by the vertical line 53a, showing that when the wheel arrangement 14 is in this configuration, the signal NLG_LOCKED_DOWN and the signal NLG_NOT-_LOCKED_UP will be output at value will be output at value 0.

It will be appreciated that in other embodiments, signals indicating configuration statuses of other components of the nose landing gear 2 could be provided. For example, FIGS. 10a and 10b are respectively a photograph and depth image of the nose landing gear 2 including the right-side door 13a and left-side door 13b in extended configuration. The depth image of FIG. 10b includes a bounding box 60a enclosing part of the right-side door 13a, in particular a part including a hinge of the right-side door 13a, and a bounding box 60b enclosing part of the left-side door 13b, again in particular a part including a hinge of the door. FIGS. 11a and 11b show from different angles the lidar data generated by the lidar scanner 15 when scanning the nose landing gear 2, in particular the right-side door 13a and left-side door 13b thereof, in extended configuration. FIGS. 12a and 12b are respectively a photograph and depth image of the right-side door 13a and left-side door 13b in retracted configuration, and FIGS. 13a and 13b show from different angles the corresponding lidar data generated by the lidar scanner 15. Thus, it can be seen that the method described above can be used with the bounding boxes 60a and 60b and appropriate predetermined position thresholds to provide signals indicating when the right-side door 13a and left-side door 13b have different configuration statuses.

It will be appreciated that bounding boxes, i.e. the predetermined regions, will be chosen to give the desired results. It has been found that a region covering only an area of a component containing a part of the component can provide a more reliable result, particularly in different lighting conditions, than if the lidar data for the whole of a component is used, while at the same time requiring less processing resources. The part can for example be a hinge, strut, connector or actuator of a wheel arrangement, door, or any other component of a landing gear assembly of which it is desirable to determine the configuration status.

For a given predetermined region, it will be appreciated that a threshold position can be determined to provide the required output signal.

While the disclosure herein has been described and illustrated with reference to particular embodiments, it will be appreciated by those of ordinary skill in the art that the disclosure herein lends itself to many different variations not specifically illustrated herein.

In particular, while the above embodiment has been described with reference to a nose landing gear, it will be appreciated that the disclosure herein is equally applicable to other landing gear, such as main landing gear, as well as to nose or other landing gear that moves between retracted and extended configuration in ways different to that described above, and/or that include different components to those described above. (For example, landing gear with a different number of doors that are positioned and/or move in different ways, or that have no doors at all; and/or that have different wheel assemblies that operate in different ways, or that do not comprise wheels.)

Where in the foregoing description, integers or components are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, whilst of possible benefit in some embodiments of the disclosure herein, may not be desirable, and may therefore be absent, in other embodiments.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of determining a configuration status of a component of a landing gear assembly of an aircraft, the method comprising:

attaching a lidar system to the aircraft;

activating the lidar system to cause the lidar system to initiate scanning of the component of the landing gear assembly to generate a set of position data points;

selecting a subset of the position data points, wherein the subset of the position data points consists of position data points corresponding to positions in a predetermined region of the landing gear assembly, wherein the predetermined region includes a part of the component of the landing gear assembly;

determining a representative position point of the subset of position data points;

determining whether the position of the representative position point is beyond a predetermined threshold position;

when the representative position point is beyond the predetermined threshold position, outputting a signal indicating that the component of the landing gear assembly has a first configuration status; and when the representative position point is not beyond the predetermined threshold position, outputting a signal indicating that the component of the landing gear assembly has a second configuration status;

wherein the landing gear assembly is a nose landing gear of the aircraft; and wherein the lidar system is attached inside a landing gear bay for the nose landing gear.

2. The method of claim 1, wherein the representative position point is a centroid point of the subset of the position data points.

3. The method of claim 1, wherein the predetermined threshold position is a position along an axis of the predetermined region of the landing gear assembly.

4. The method of claim 1, wherein the component of the landing gear assembly comprises one or more parts that are not included in the predetermined region.

5. The method of claim 1, wherein the component of the landing gear assembly is a landing gear door or a landing gear wheel assembly.

6. The method of claim 5, wherein:

the first configuration status is an open status indicating that the landing gear door is open; and the second configuration status is a closed status indicating that the landing gear door is closed.

7. The method of claim 5, wherein:

the first configuration status is an extended status, indicating that the landing gear wheel assembly is extended; and

US 12,686,503 B2

9 the second configuration status is a retracted status, indicating that the landing gear wheel assembly is retracted.

8. The method of claim 1, wherein the part of the component of the landing gear assembly is a hinge, a movable strut, and/or an actuator.

9. The method of claim 1, comprising determining whether the position of the representative position point is beyond a second predetermined threshold position; and when the representative position point is beyond the second predetermined threshold position, outputting a signal indicating that the component of the landing gear assembly has a third configuration status;

when the representative position point is not beyond the second predetermined threshold position, outputting a signal indicating that the component of the landing gear assembly has a fourth configuration status.

10. An aircraft comprising:

a landing gear assembly comprising a component;

a lidar system attached to the aircraft and configured to scan the component of the landing gear assembly and to generate a set of position data points; and a computer system configured to output a signal indicating a configuration status of the component of a landing gear assembly using the set of position data points in accordance with the method of claim 1.

11. The method of claim 1, wherein the lidar system is attached on a back interior wall of the landing gear bay for the nose landing gear.

12. The method of claim 11, wherein the lidar system is attached at a height above a level of a door of the landing gear bay.

13. The method of claim 12, wherein the predetermined region of the landing gear assembly is defined virtually by a bounding box that includes a wheel arrangement of the nose landing gear.

14. The method of claim 13, wherein:

selecting the subset of the position data points comprises discarding any position data points outside the bounding box;

determining the representative position point of the subset of position data points comprises determining a centroid point of the subset of position data points;

the centroid point is a mean average of all of position data points of the subset of position data points that are within the bounding box, such that the centroid point is representative of an overall position of the position data points within the bounding box.

15. The method of claim 14, wherein determining whether the position of the representative position point is beyond a predetermined threshold position comprises comparing the centroid point to the predetermined threshold position.

16. The method of claim 15, wherein:

the centroid point changes as the wheel arrangement changes configuration; and only the position of the centroid point along a single axis is used for determining whether the position of the representative position point is beyond a predetermined threshold position.

17. The method of claim 16, wherein activating the lidar system comprises receiving a signal at the lidar system to initiate scanning of the component of the landing gear assembly.

18. An aircraft comprising:

a landing gear assembly comprising a component;

a lidar system attached to the aircraft and configured to, upon receipt of a control signal that activates the lidar system, scan the component of the landing gear assembly and to generate a set of position data points from the scanning; and a computer system configured to:

send the control signal to the lidar system to initiate the scanning;

select a subset of the position data points, wherein the subset of the position data points consists of position data points corresponding to positions in a predetermined region of the landing gear assembly, wherein the predetermined region includes a part of the component of the landing gear assembly;

determine a representative position point of the subset of position data points;

determine whether the position of the representative position point is beyond a predetermined threshold position;

when the representative position point is beyond the predetermined threshold position, output a signal indicating that the component of the landing gear assembly has a first configuration status; and when the representative position point is not beyond the predetermined threshold position, output a signal indicating that the component of the landing gear assembly has a second configuration status.

19. The aircraft according to claim 18, wherein the lidar system is configured to scan the component of the landing gear assembly upon receipt of a signal that activates the lidar system.

* * * * *